United States Patent
Diedrich

(10) Patent No.: US 7,429,084 B2
(45) Date of Patent: Sep. 30, 2008

(54) RELEASABLE CHAIR SECTION SECURING ASSEMBLY

(75) Inventor: Thomas J. Diedrich, DePere, WI (US)

(73) Assignee: Kruger International, Inc., Green Bay, WI (US)

( * ) Notice: Subject to any disclaimer, the term of this patent is extended or adjusted under 35 U.S.C. 154(b) by 327 days.

(21) Appl. No.: 10/515,200

(22) PCT Filed: Jun. 14, 2002

(86) PCT No.: PCT/US02/19211

§ 371 (c)(1),
(2), (4) Date: Nov. 22, 2004

(87) PCT Pub. No.: WO02/102198

PCT Pub. Date: Dec. 27, 2002

(65) Prior Publication Data

US 2006/0049681 A1    Mar. 9, 2006

Related U.S. Application Data

(60) Provisional application No. 60/298,469, filed on Jun. 15, 2001.

(51) Int. Cl.
*A47C 7/42* (2006.01)

(52) U.S. Cl. ............... 297/440.16; 297/440.24; 297/440.2

(58) Field of Classification Search ........... 297/440.2, 297/440.21, 440.24, 411.26; 403/292, 348
See application file for complete search history.

(56) References Cited

U.S. PATENT DOCUMENTS

| | | | |
|---|---|---|---|
| 13,112 A | 6/1855 | Waterhouse | |
| 1,189,802 A * | 7/1916 | Eckert | 285/314 |
| 2,461,055 A * | 2/1949 | Greitzer | 297/440.21 |
| 4,462,621 A | 7/1984 | Chapman | |
| 4,750,784 A | 6/1988 | Schwartz | |
| 5,149,149 A * | 9/1992 | Wu | 285/402 |
| 5,498,054 A | 3/1996 | Tomlinson | |
| 5,536,063 A | 7/1996 | Cable | |
| 5,577,799 A * | 11/1996 | St. Germain | 297/35 |
| 5,678,890 A * | 10/1997 | Tenbroeck | 297/271.6 |
| 6,422,780 B2 * | 7/2002 | Chen | 403/294 |
| 6,530,682 B2 * | 3/2003 | Wu | 362/413 |
| 6,543,958 B2 * | 4/2003 | Huang | 403/292 |
| 6,623,022 B2 * | 9/2003 | Malassigne et al. | 280/250.1 |
| 6,672,792 B1 * | 1/2004 | Schipani et al. | 403/322.4 |
| 2001/0000833 A1 * | 5/2001 | Chen | 30/254 |

* cited by examiner

*Primary Examiner*—Sarah B McPartlin
(74) *Attorney, Agent, or Firm*—Boyle Fredrickson, S.C.

(57) ABSTRACT

A releasable securing assembly for attaching first and second sections of a chair to one another is disclosed. The first chair section includes a receiver having a capture portion spaced from a collar portion. The collar and capture portions include a passage and a bore, respectively, that are aligned with each other. A locking member having a locking passage, can be positioned between the capture and collar portions of the receiver so that the passage, the locking passage, and the bore are aligned. A second chair section includes at least one outwardly extending shaft having a cross pin disposed on an end thereof. The shaft and cross pin are inserted through the collar portion and cooperate with the locking member so that the locking member may be rotated to engage a locking surface of the locking member with the cross pin, selectively locking the first and second chair sections together.

20 Claims, 5 Drawing Sheets

RELEASABLE CHAIR SECTION SECURING ASSEMBLY

CROSS-REFERENCE TO RELATED APPLICATIONS

This application claims the benefit of U.S. Provisional Application Ser. No. 60/298,469, filed Jun. 15, 2001.

FIELD OF THE INVENTION

The present invention relates to a mounting and/or securing assembly for a chair, and more specifically to a releasable securing assembly for mounting a first section of a chair to a second section.

BACKGROUND OF THE INVENTION

In order to fix sections of a chair to one another to form a complete chair construction, many different mounting and securing assemblies have been utilized. Some such mounting and securing assemblies have been developed in order to allow the components or sections of a chair to be releasably secured to one another. As a result, the majority of the mechanisms which secure chair sections to one another can be classified as one of two types, namely, securing mechanisms which releasably fix the sections to one another and mechanisms which permanently attach the chair sections to one another.

Mechanisms that releasably lock chair sections to one another are very useful. They enable chairs to be broken down for shipment or storage, to have additional parts added to the chair to perform different functions or to adapt to different environments, or to have damaged sections of the chair replaced without having to replace the entire chair.

However, in the prior art, many shortcomings can be found in the design and/or functioning of known mechanisms that releasably secure chair sections to one another. For example, such mechanisms may be easily disengaged, enabling the chair to become disassembled. Furthermore, such mechanisms may include a number of levers or spring biased parts which greatly increase the complexity and cost of the chairs incorporating these mechanisms. Other types of mechanisms require tools and several assembly steps to secure the chair sections together. Most mechanisms of this type have visible and exposed fasteners that are used to secure the chair components together.

As a result, it is desirable to develop a releasable securing mechanism for a chair that enables the sections of the chair to be releasably locked in engagement with one another, and that has a simple construction to greatly reduce the cost of incorporating the securing mechanism within the chair.

SUMMARY OF THE INVENTION

It is an object of the present invention to provide a releasable securing mechanism for chair sections that has a simple construction, is easy to use and cannot be inadvertently disassembled.

It is another object of the invention to provide a securing mechanism that has components that can be formed separately from the chair or can be incorporated into another component of the chair.

It is still another object of the invention to provide a releasable securing mechanism that is readily concealable within the chair construction to provide an aesthetically pleasing overall appearance to the chair, and which does not involve visible or exposed fasteners.

It is still another object of the invention to provide a releasable securing mechanism that is inexpensive to manufacture.

The present invention is a releasable securing mechanism for a chair that includes at least one receiver disposed on a first section of the chair and at least one shaft extending outwardly from a second section of the chair. The receiver includes a collar portion having a passage extending therethrough and a capture portion spaced from the collar portion. A locking sleeve is movably positionable between the collar portion and the capture portion of the receiver and includes a passage selectively alignable with the passage extending through the collar portion. The locking sleeve is movable between an unlocked position and a locked position.

The shaft includes an outward end spaced from the second chair section and a cross pin mounted to the shaft adjacent the outward end. The ends of the cross pin define a pair of protrusions which extend outwardly from the shaft. The collar portion passage and the locking sleeve passage each have an irregular cross-section shaped so as to receive the shaft and the protrusions defined by the ends of the cross pin. After positioning the locking sleeve within the receiver between the capture portion and the collar portion and aligning the locking sleeve passage with the collar portion passage, the outward end of the shaft can be inserted through the collar portion and into the locking sleeve, which is in its unlocked position, such that the protrusions defined by the ends of the cross pin are positioned within the locking sleeve. The locking sleeve can then be rotated to its locked position, to engage the ends of the cross pin with a locking shoulder associated with the locking sleeve passage. The rotation of the locking sleeve also serves to misalign the irregular areas of the collar portion passage and the locking sleeve passage such that, regardless of the engagement of the cross pin with the locking slot, the shaft cannot be removed from within the locking sleeve until the collar portion passage and locking sleeve passage are realigned.

The locking sleeve can also be incorporated within the construction of an arm or other component to be utilized with the chair. For example, the locking sleeve can be located at one end of an arm such that when the locking sleeve is rotated to its locked position to engage the cross pin within the locking slot, the arm is moved to a conventional arm location along one side of the second portion of the chair and engaged thereon to provide a conventional armrest for the chair. In either version, the chair components are secured together using the locking sleeve, which eliminates the use of visible fasteners and which blends into the adjacent areas of the chair so as not to detract from the appearance of the chair.

These and other objects, advantages and features of the invention will be made apparent to those skilled in the art from the following detailed description taken together with the drawings.

BRIEF DESCRIPTION OF THE DRAWINGS

The following drawing figures illustrate the best mode currently contemplated of practicing the present invention.

In the drawings:

FIG. 6 is a cross-sectional view of the securing assembly of FIG. 1 in the unlocked position;

FIG. 7 is a cross-sectional view similar to FIG. 6 along line 7-7 of FIG. 2 illustrating the securing assembly of FIG. 1 in the locked position;

DETAILED DESCRIPTION OF THE INVENTION

Figure 1:
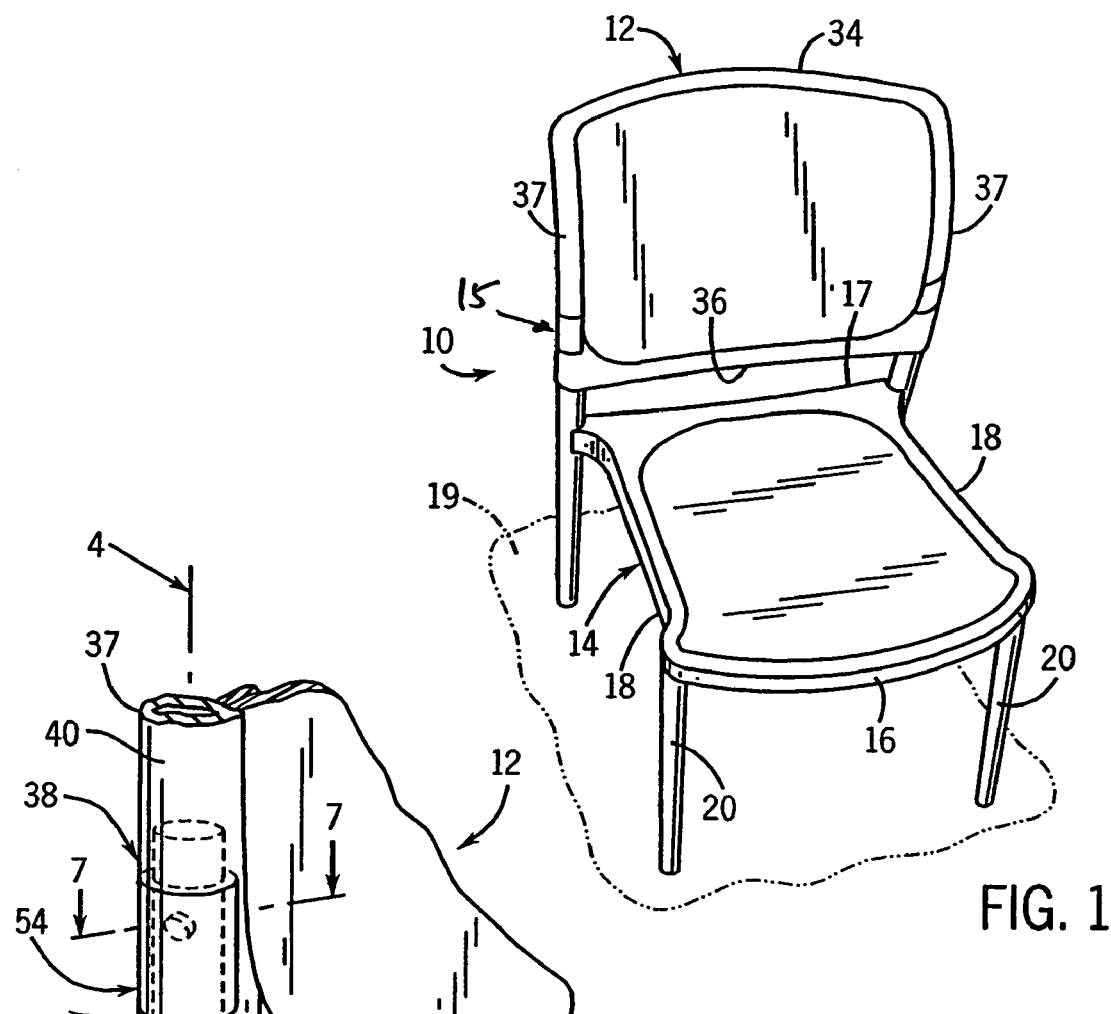
FIG. 1 is an isometric view of a chair incorporating the releasable chair section securing assembly of the present invention.
Figure 2:
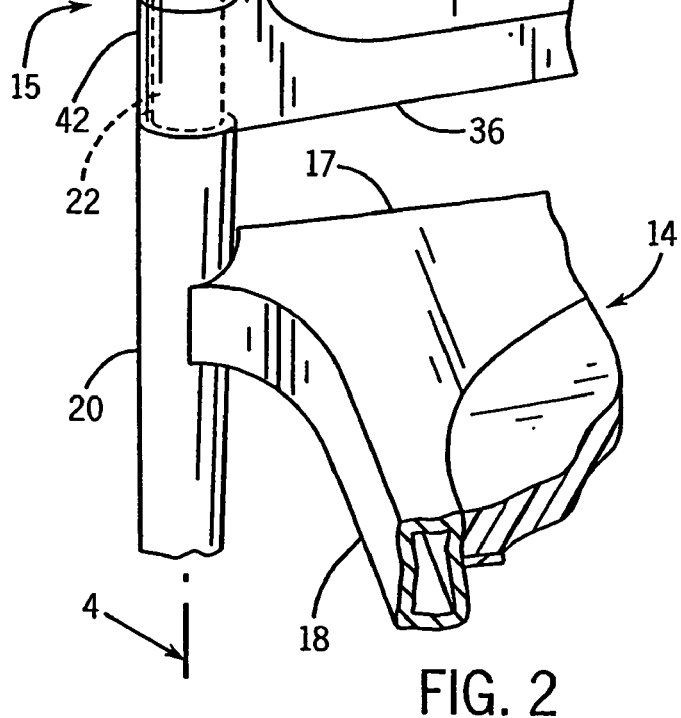
FIG. 2 is an enlarged partial isometric view, with portions broken away, showing the securing assembly of FIG. 1.
Figure 3:
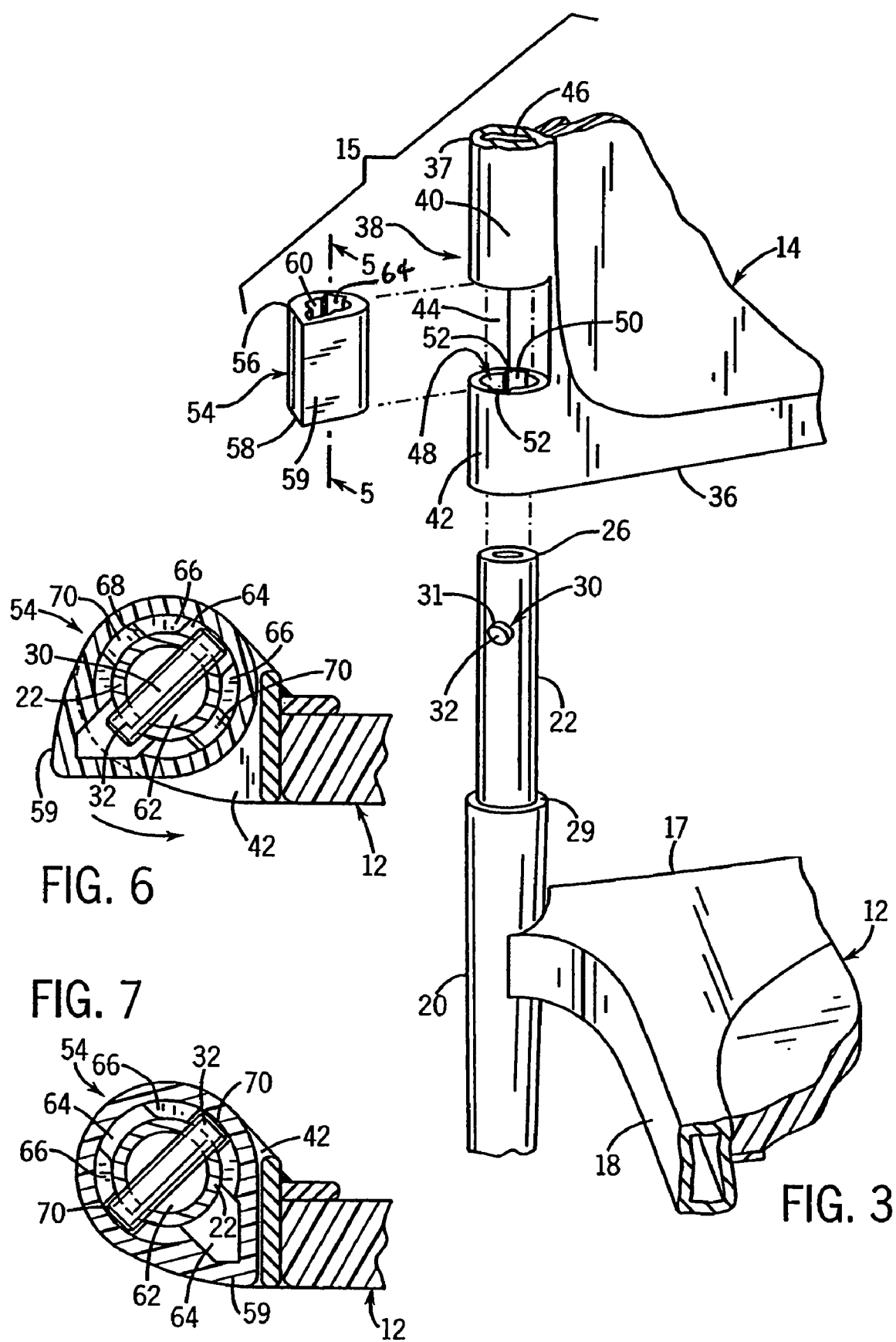
FIG. 3 is an exploded isometric view showing the components of the securing assembly of FIG. 1.
Figure 4:
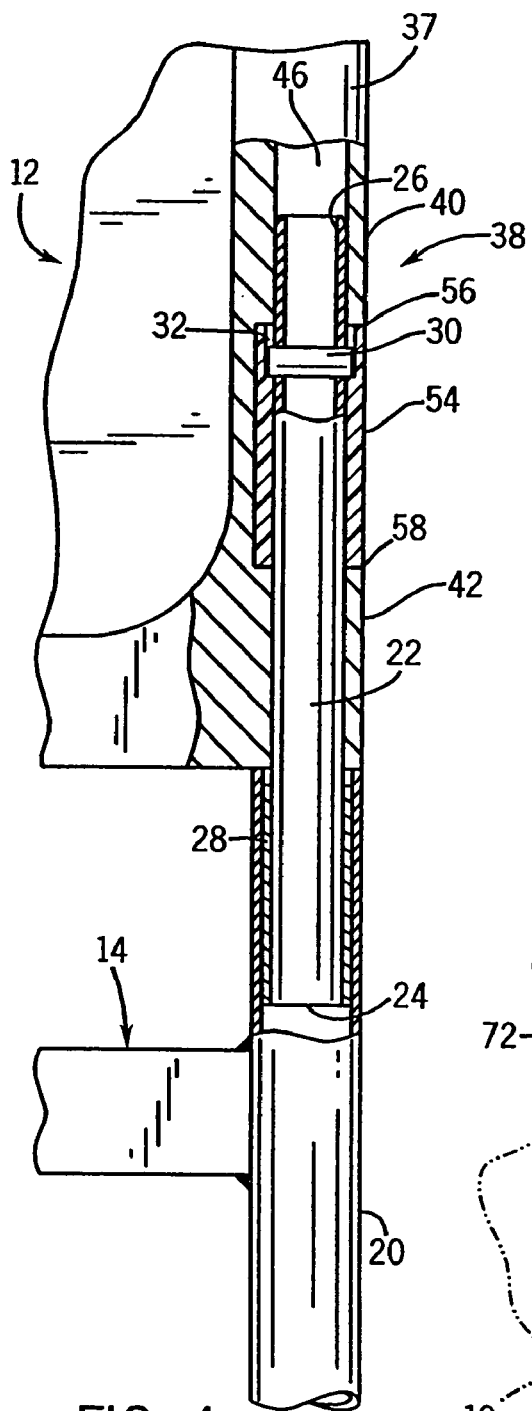
FIG. 4 is a cross-sectional view along line 4-4 of FIG. 2.

With reference now to the drawing figures in which like reference numerals designate like parts throughout the disclosure, a chair indicated generally at 10 is disclosed in FIG. 1. The chair 10 includes a generally rectangular back section 12 secured to a generally rectangular seat section 14 by means of a releasable securing assembly 15, in accordance with the present invention. The seat 14 includes a front end 16 spaced from a rear end 17 by a pair of side edges 18 and is supported above a floor or other supporting surface 19 by a number of legs 20 downwardly extending from the seat 14. Preferably, the legs 20 extend downwardly from each end of both the front end 16 and the rear end 17, with the back 12 mounted to the seat 14 adjacent the rear end 17.

Referring now to FIGS. 1-4, each leg 20 located at the rear end 17 of the seat 14 extends upwardly above the seat 14 a short distance. A shaft 22 is secured to and extends upwardly from each leg 20 adjacent the rear end 17 and is used to secure the back 12 to the seat 14 as a first part of the securing assembly 15. Each shaft 22 is formed of a rigid material and is generally tubular in shape, including an inner end 24 that is engaged within a passage defined by leg 20 and an outer end 26 spaced from the inner end 24. The inner end 24 of each shaft 22 is secured within the leg 20 by inserting the inner end 24 into an opening 27 defined within a spacer tube 28 that is disposed within the upwardly open passage defined by the upper end 29 of each leg 20. The tube 28 is formed of a generally resilient material and has an outer diameter approximately equal to the inner diameter of the passage defined by leg 20, and an inner diameter slightly less than the diameter of the shaft 22. The tube 28 is secured to the leg 20, preferably by an adhesive or by frictional contact, in order to maintain the position of the tube 28 within the leg 20. The inner end 24 of the shaft 22 can then be inserted into the tube 28, which frictionally engages the shaft 22 and provides a compressive force applied to the shaft 22 which retains the shaft 22 in position with respect to the leg 20. Shaft 22 extends upwardly from the upper end 29 of leg 20 which forms an upwardly facing shoulder located above seat 12.

With this construction, shaft 22 forms a reduced diameter extension of the upper end of leg 20. It is understood that various other constructions may be employed to provide a similar arrangement, e.g. by forming a reduced diameter extension integrally with the upper end of leg 20 or in any other satisfactory manner.

Opposite the inner end 24, a generally cylindrical cross pin 30 is disposed within an opening 31 formed in the shaft 22 adjacent the outer end 26. The cross pin 30 is formed of a rigid material and extends perpendicularly through the shaft 22 so that the ends of the cross pin 30 form a pair of projections 32 extending outwardly from opposite sides of the shaft 22.

While the legs 20, shaft 22, spacer tube 28 and cross pin 30 are each illustrated as being generally circular in cross section, these elements can have any shape desired so long as the leg 20, shaft 22 and tube 28 are adapted to fit within and engage one another and the cross pin 30 has a length sufficient to extend through at least one side of the shaft 22. It is also understood that any other satisfactory construction may be used to form a projection such as 32 extending outwardly from shaft 22, in place of cross pin 30.

Looking again at FIGS. 1-4, the back 12 of the chair 10 includes a top end 34 and a bottom end 36 joined by a pair of opposed side edges 37. The side edges 37 include a pair of receivers 38 disposed adjacent the bottom end 36 which are utilized as a second part of the securing assembly 15 to secure the back 12 to the shafts 22 extending upwardly from the seat 14. Each receiver 38 is formed of a capture portion 40 disposed on the side edge 37 above a collar portion 42, to define a space 44 therebetween.

The capture portion 40 is integrally formed within one side edge 37 of the back 12 and includes a central bore 46 disposed adjacent the space 44. The bore 46 extends upwardly into the capture portion 40 and has a diameter slightly greater than the outside diameter of the shaft 22 such that the outer end 26 of the shaft 22 can be captured and retained by the bore 46 within the capture portion 40. Capture portion 40 may be in the form of a downwardly open passage formed in the lower end of side edge 37 of back 12, although any other satisfactory structure defining an open passage may be employed.

The collar portion 42 is also integrally formed at the lower end of side edge 37 of the back 12. In the illustrated embodiment, collar portion 42 is located at the lateral side of lower end 36 of back 12, and is integrally formed therewith. Collar portion 42 is generally cylindrical in shape, defining a passage 48 that opens upwardly and downwardly and that extends completely through collar portion 42. The passage 48 in collar portion 42 defines a generally circular side wall 50 and a pair of grooves 52 extending outwardly from opposite sides of side wall 50. The passage 48 is disposed beneath and in alignment with the bore 46 in the capture portion 40. The passage 48 has a diameter approximately equal to the diameter of the bore 46, such that the shaft 22 can be inserted through the passage 48 in the collar portion 42 in order to allow the outer end 26 of the shaft 22 to be engaged within the bore 46 of the capture portion 40. Further, the grooves 52 are aligned with the projections 32 extending outwardly from opposite sides of the shaft 22. This enables the projections 32 to pass through the passage 48 and into the space 44 when the outer end 26 of the shaft 22 is inserted into the capture portion 40.

FIGS. 3 and 5-7 illustrate a third part of the securing assembly 15, namely, a locking sleeve 54 formed of a generally rigid material, such as a hard plastic. The sleeve 54 is generally tubular in shape and includes an upper end 56, a lower end 58 and a side wall having a tapered side section 59 extending outwardly from the side wall. An axial pin passage 60 is defined by the sleeve 54 and extends through the sleeve 54 from the lower end 58 to the upper end 56. The pin passage 60 is formed similarly to the passage 48 in collar portion 42, defining a generally circular side wall 62 and a pair of grooves 64 extending outwardly from opposite sides of the side wall 62.

Adjacent the upper end 56, the sleeve 54 further includes a pair of opposed recessed annular shoulders 66 extending between the grooves 64. Each shoulder 66 includes one or more detents or locking recesses 68 which are formed in the surface of the shoulder 66. The recesses 68 are in the form of opposed pairs of depressions 70 located on opposite shoulders 66 that are in alignment with one another to engage and retain the projections 32 formed by the cross pin 30 when the shaft 22 is inserted through the pin aperture 60 in the locking sleeve 54, upon rotation of locking sleeve 54 in a manner to be explained.

To assemble the chair 10, initially the legs 20 are secured to the four corners of the seat 14 in any suitable, conventional manner in order to support the seat 14 above the floor. Prior to assembly of legs 20 to seat 14, a spacer tube 28 is inserted into and secured to each of the legs 20, and the inner end 24 of a shaft 22 is inserted within the spacer tube 28 to secure the shaft 22 to each leg 20.

A locking sleeve 54 is then inserted into the space 44 between the capture portion 40 and collar portion 42 of each receiver 38, each of which is disposed on a side edge 37 of the back 12. Locking sleeve 54 has a length slightly less than space 44 between capture portion 40 and collar portion 42, such that locking sleeve 54 occupies substantially the entirety of space 44. Each sleeve 54 is positioned such that its passage 60 is aligned with bore 46 of capture portion 40 and with passage 48 of collar 42. Further, each sleeve 54 is rotationally positioned to align grooves 64 of sleeve passage 60 with grooves 50 of collar passage 48.

Once a locking sleeve 54 is properly positioned within each receiver 38, the outer end 26 of each shaft 22 is inserted through the passage 48 in each collar portion 42 and through the pin passage 60 in each locking sleeve 54 to enable the outer end 26 of each shaft 22 to be engaged within the bore 46 of each capture portion 40 and the collar portions 42 to abut the upper ends 29 of the rear legs 20. The projections 32 defined by the ends of cross pin 30 pass through the aligned grooves 50 of collar passage 48 and grooves 64 of sleeve passage 60 upon insertion of shaft 22 through passages 48 and 60. By engaging the ends of shafts 22 within the capture portions 40, the back 12 is mounted in its desired position relative to seat 14. With back 12 positioned in this manner, the cross pin 30 on each shaft 22 is positioned level with the annular shoulders 66 in each locking sleeve 54. Each sleeve 54 is then rotated to its locked position of FIG. 7. This is done by grasping the tapered side portion 59 and moving it towards the back 12 to move grooves 64 of sleeve passage 60 out of alignment with projections 32 defined by the ends of cross pin 30. This functions to engage the projections 32 with the locking recesses 68 located on the shoulders 66. The sleeve 54 is rotated until the projections 32 each rest within one of the pairs of opposed, aligned depressions 70 so that the pin 30 is retained within the locking sleeve 54. Depressions 70 define a detent for projections 32, to prevent inadvertent rotation of sleeve 54 and to thereby prevent the shafts 22 from being removed from the receivers 38. In this manner, sleeves 54 function to secure the back 12 to the seat 14. When sleeve 54 is in its locked position, the cross sectional configuration of sleeve 54 matches the adjacent areas of back 12, such that sleeve 54 blends in with back 12.

To disengage the back 12 from the seat 14, the locking sleeves 54 are rotated in the opposite direction to the unlocked position of FIG. 6, such that the grooves 64 of sleeve passage 48 are returned into alignment with projections 32 and grooves 50 of collar passage 48. This enables back 12 to be lifted upwardly relative to seat 14, causing projections 32 to move within grooves 64 and 50 and to enable removal of shafts 22 from receivers 38.

Figure 5:
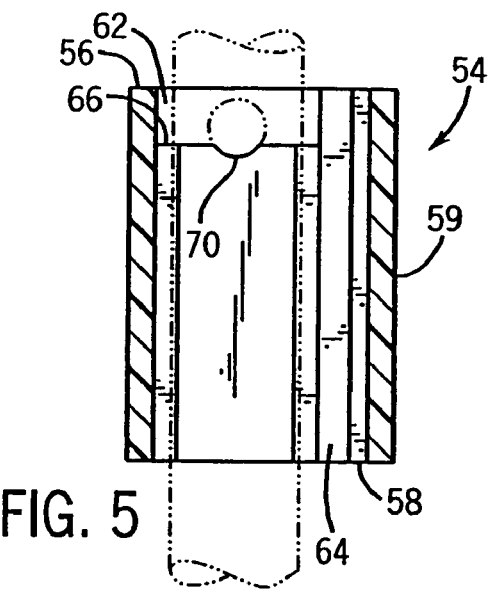
FIG. 5 is a cross-sectional view along line 5-5 of FIG. 3.
Figure 8:
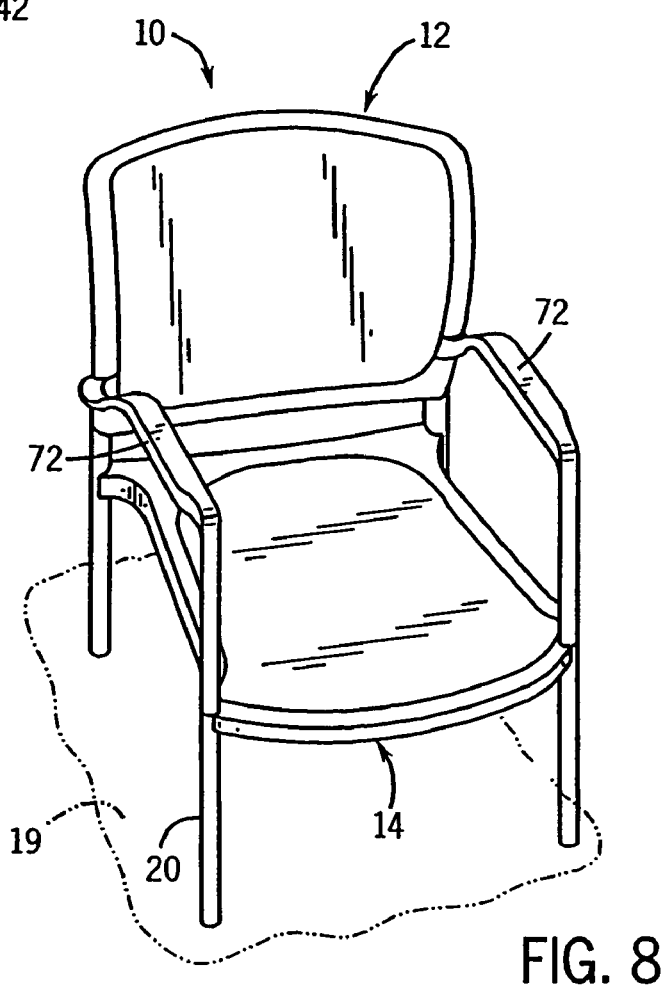
FIG. 8 is an isometric view of a chair incorporating a second embodiment of the invention.
Figure 9:
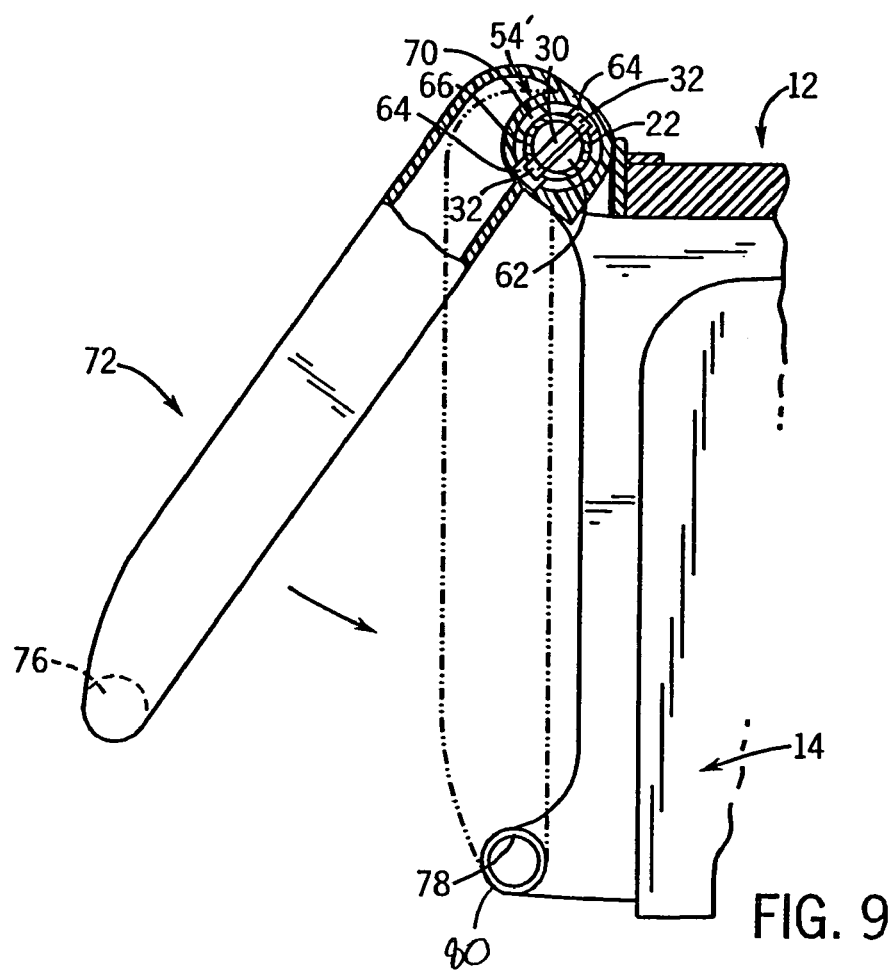
FIG. 9 is a partial top plan view, with portions in section, illustrating the securing assembly of FIG. 8.
Figure 10:
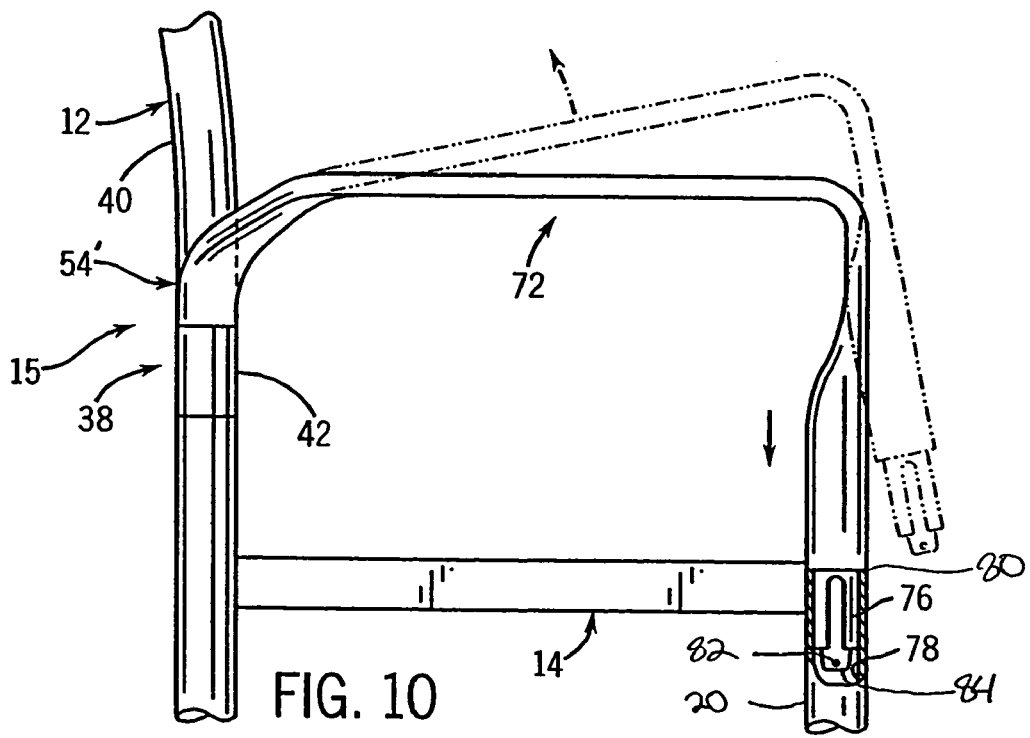
FIG. 10 is a partially broken away side elevation view of the securing assembly of FIG. 8.
Figure 11:
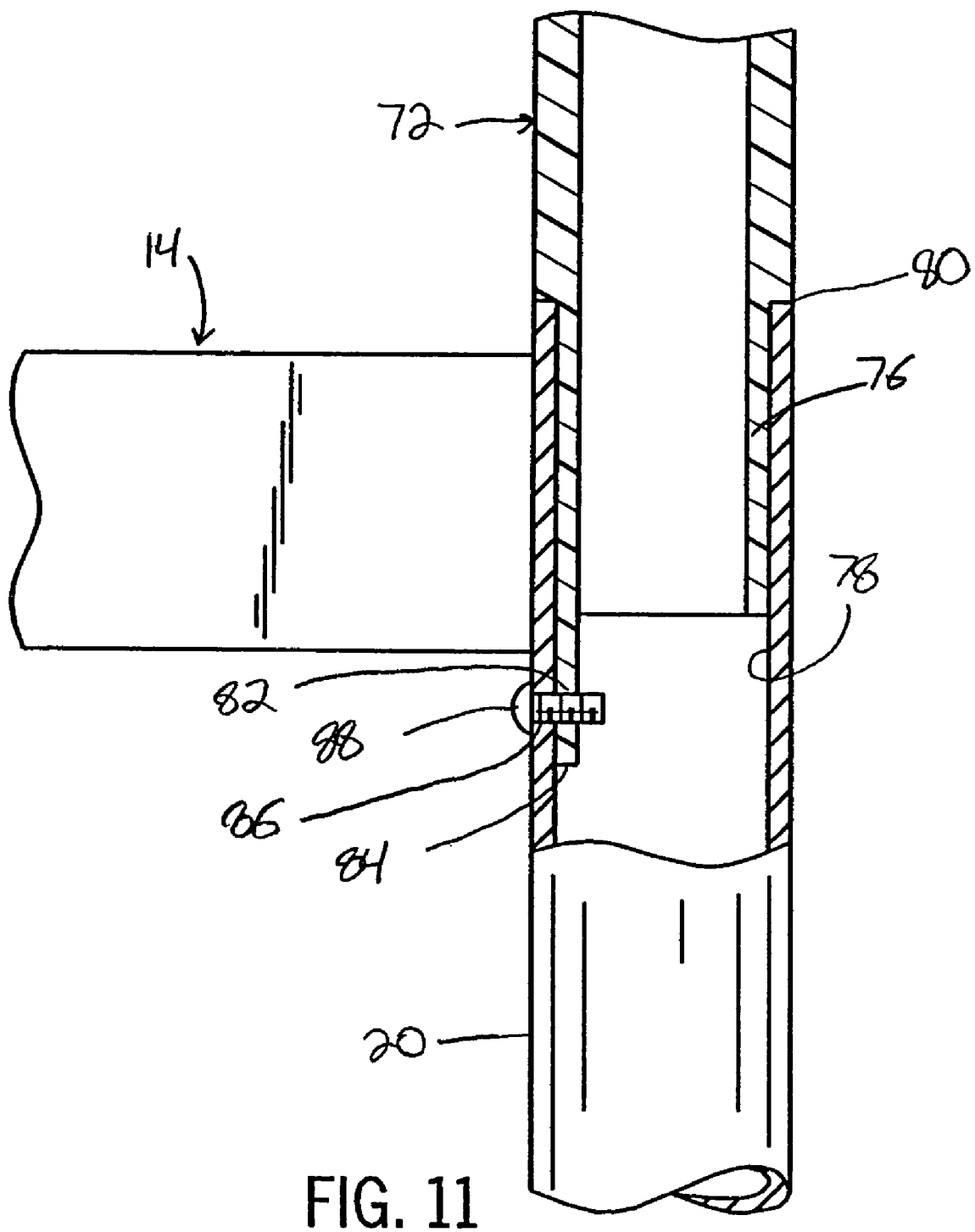
FIG. 11 is an enlarged partially broken away front elevation view of the securing assembly of FIGS. 8-10.

While the locking sleeve 54 is illustrated in FIGS. 5-7 as having a generally circular cross section with the tapered side section 59, the sleeve 54 can be shaped as necessary to accommodate the shape of the shaft 22 and of the receivers 38 on the chair back 12 in order to provide an aesthetically pleasing, seamless appearance to each side edge 37 of the back 12. Further, locking sleeves 54 function to secure back 12 and seat 14 together without the use of fasteners, which otherwise detract from the external appearance of the chair.

While the above written description describes the current best mode of practicing the claimed invention, various other alternative embodiments of the securing assembly 15 and various parts of the securing assembly 15 are also included within the scope of the present invention. For example, a projection such as is formed by the cross pins 30, may extend from only one side of each shaft 22 to engage a single locking recess 68 located on an annular shoulder 66 within the locking sleeve 54. Furthermore, while the receivers 38 are shown as being integrally formed with a side edge 37 of the back 12, the capture portion 40 and collar portion 42 of each receiver 38 can be formed separately from the back 12 and attached to the back 12 through any suitable means in order to form the receivers 38 on each side edge 37 of the back 12. Also, the shape of each of the portions of the mounting assembly, namely the receivers 38, including both the capture portion 40 and collar portion 42, the locking sleeve 54, and the shafts 22 can be shaped as necessary to accommodate the particular configuration of the back 12, seat 14 and shafts 22.

Furthermore, in an alternative embodiment for the securing assembly 15 shown in FIGS. 8-11, a sleeve 54' can be integrally incorporated at one end of an arm 72 for the chair 10, or can be a separate component secured to the end of arm 72 in any satisfactory manner. The sleeve 54' includes the pin passage 60 having grooves 64, as described previously, and is positionable between the capture portion 40 and collar portion 42 of the receivers 38 on each side edge 37 of the back 12 in order to secure the arm 72 to the back 12 when the shaft 22 is inserted through the receiver 38 and the sleeve 54'. Opposite the sleeve 54', each arm 72 may be secured to the structure of chair 10 in any satisfactory manner. For example, the opposite end of arm 72 may include a plug 76 that is adapted to be inserted into one of a pair of passages 78 disposed in the upper ends 80 of the legs 20 extending downwardly from the front end 16 of the seat 14 opposite the shafts 22. When the arms 72 are each rotated to turn the sleeve 54' and engage the projections 32 with the shoulders 66, in the manner described above, the end of the arm 72 including the plug 76 is also rotated from a location spaced from the chair seat 14 to a position where the plug 76 is placed adjacent the opening 78. The arm 72, which is formed of a generally rigid but flexible material, such as a hard plastic, can be deflected upwardly in order to enable the plug 76 to be positioned directly over the opening 78. The plug 76 is then inserted into the opening 78 to retain the arm 72 in engagement with the front end 18 of the seat 14 in order to secure the arm 72 to the chair 10 and lock the back 12 in engagement with the seat 14. The plug 76 can also include a threaded opening 82 disposed in a lower end 84 of the plug 76. When the plug 76 is inserted into the opening 78, the threaded opening 82 is aligned with a bore 86 disposed in the leg 20. A threaded fastener 88, such as a screw, can then be inserted through the bore 86 and engaged within the threaded opening 82 to prevent disengagement of plug 76 from leg 20.

The invention has been shown and described with respect to the mounting of a chair back to a chair. It should be understood, however, that the invention may also be employed to mount other chair components to a chair frame or other structural member, including mounting of a chair seat, headrest or the like. Further, while the invention has been shown and described in the context of a chair with legs, it is understood the invention may also be incorporated in a chair having a pedestal type support. The invention may be used to mount any chair component to a structural member, in which the chair component has a passage adapted to receive a shaft or the like, and in which the passage is defined by spaced apart structures between which a locking member can be positioned.

Various alternatives are contemplated as being within the scope of the following claims particularly pointing out and distinctly claiming the subject matter regarded as the invention.

I claim:

1. A releasable securing assembly for a chair, the assembly comprising:
   a first chair section having at least one receiver, wherein the receiver includes a passage that is defined by first and second receiver portions, wherein the first and second receiver portions are separated from each other by a space, and wherein the passage extends completely through the first receiver portion and at least partially into the second receiver portion;
   a second chair section having at least one outwardly extending member, wherein the outwardly extending member is adapted to be inserted into the receiver passage in a first direction through the first receiver portion and through the space between the first and second receiver portions and into engagement with the second receiver portion, wherein the outwardly extending member includes a transverse projection located within the space between the first and second receiver portions; and
   at least one locking member positionable within and adapted to be inserted into the space between the first and second portions of the receiver in a second direction that is non-parallel relative to the first direction, the locking member including a transverse locking surface and an aperture configured to be aligned with the passage in the receiver, wherein the aperture is configured to enable the outwardly extending member to extend outwardly from the first receiver portion, through the locking member and into engagement with the second receiver portion, and wherein the locking member is movable relative to the outwardly extending member between a locked position in which the transverse locking surface of the locking member releasably engages and retains the projection to prevent movement of the outwardly extending member relative to the receiver, and an unlocked position in which the transverse locking surface disengages the projection to enable movement of the outwardly extending member relative to the receiver.

2. The assembly of claim 1 including a pair of receivers disposed on opposite sides of the first section and a pair of outwardly extending members disposed on opposite sides of the second section and adapted to be inserted into the respective receiver passages.

3. The assembly of claim 1 wherein the at least one outwardly extending member and the at least one locking member have matching cross sections.

4. The assembly of claim 3 wherein the outwardly extending member has a passage defining a circular cross section and the outwardly extending member has a circular cross section, and wherein the locking member is rotatable between its locked and unlocked positions about an axis of rotation coincident with a longitudinal axis defined by the outwardly extending member.

5. The assembly of claim 1 wherein the projection is a cross pin mounted to the at least one outwardly extending member that extends outwardly from one side of the at least one outwardly extending member.

6. The assembly of claim 5 wherein the locking member defines a passage having at least one outwardly extending groove adapted to receive the projection.

7. The assembly of claim 6 wherein the transverse locking surface comprises at least one transverse shoulder recessed from one end of the locking member and adapted to engage the projection when the locking member is in its locked position.

8. The assembly of claim 7 wherein the transverse shoulder includes a depression adapted to receive the projection when the locking member is in its locked position.

9. The assembly of claim 1 wherein the at least one receiver is integrally formed with the first chair section.

10. A releasable securing assembly for a chair, the assembly comprising:
    a first chair section including a pair of receivers disposed on opposite sides of the first chair section, each receiver including a first portion having a first passage extending therethrough and a second portion separated from the first portion by a space, wherein the second portion includes a bore;
    a second chair section including a pair of shafts extending outwardly from opposite sides of the second section and insertable into the receivers on the first section, wherein each shaft extends through the first passage in the first receiver portion and into the bore of the second receiver portion, wherein each shaft has a laterally extending projection extending outwardly therefrom that is positioned within the space between the first and second receiver portions; and
    a pair of arms adapted to be interconnected between the first section and the second section, each arm including a locking member at one end adapted to be positioned axially adjacent the first portion of each receiver, the locking member being configured for placement into the space between the first and second receiver sections, and having a locking passage extending therethrough that is adapted to be positioned into alignment with the first passage and with the bore so that when aligned, the locking passage defines an axial extension of the first passage that is in communication with the bore, and at least one locking recess disposed within the locking passage, wherein the locking member is movable relative to the shaft between a locked position in which the locking member releasably engages and retains the projection by engagement of the projection within the locking recess, and an unlocked position in which the locking member disengages the projection.

11. The assembly of claim 10 wherein one of the first section and the second section is a chair back and the other of the first section and the second section is a chair seat.

12. The assembly of claim 11 wherein the second section is a chair seat.

13. The assembly of claim 12 further comprising a pair of openings disposed on the second section spaced from the shafts and adapted to be engaged with the arms opposite the locking members.

14. The assembly of claim 13 further comprising a plug located on each arm opposite the locking members that is releasably engageable with one of the openings when the locking members are in the locked position.

15. A method for assembling a chair comprising the steps of:

a) providing a first chair section including at least one receiver, the at least one receiver including a first portion having a first passage extending therethrough and a second portion spaced from the first portion, wherein the second portion includes a bore;

b) providing a second chair section including at least one outwardly extending shaft, the at least one shaft having a transverse projection;

c) providing at least one locking member having a locking passage extending therethrough and at least one locking surface disposed within the locking passage;

d) placing the at least one locking member between the first and second portions of the at least one receiver and positioning the locking member such that the locking passage extends between the first passage and the bore;

e) inserting the at least one shaft and the projection through the first passage in the receiver first portion and through the locking passage in the locking member, and into the bore in the receiver second portion such that the projection is aligned with the locking surface; and f) engaging the projection with the locking surface of the locking member by moving the locking member relative to the shaft.

16. The method of claim 15 wherein the at least one locking member is secured to one end of an arm and further comprising the step of engaging the other end of the arm opposite the at least one locking member to the second section after engaging the projection with the at least one locking recess.

17. The method of claim 16 wherein the step of engaging the arm to the second section comprises the steps of:

a) positioning the other end of the arm over at least one opening disposed in the second section and spaced from the at least one shaft; and b) engaging a plug on the other end of the arm within the at least one opening.

18. The method of claim 15 wherein the step of engaging the projection with the at least one locking recess is accomplished by rotating the at least one locking member with respect to the at least one shaft.

19. An arrangement for securing a first chair component to a second chair component, the arrangement comprising:

an elongated member extending outwardly from the second chair component and having transverse engagement structure;

receiver structure provided on the first chair component, wherein the receiver structure includes a pair of spaced apart receiver sections, wherein the elongated member extends through one of the receiver sections and into engagement with the other of the receiver sections, and wherein the transverse engagement structure is located within a space defined between the pair of spaced apart receiver sections; and a locking member located within the space between the pair of spaced apart receiver sections and axially abutting at least one of the spaced apart receiver sections, wherein the locking member includes a passage through which the elongated member extends, wherein the locking member is movable relative to the receiver sections and relative to the elongated member between a locked position in which locking structure associated with the locking member engages the transverse engagement structure so as to prevent relative movement between the elongated member and the receiver structure, and an unlocked position wherein the transverse engagement structure of the elongated member is disengaged from the locking structure of the locking member for enabling relative axial movement between the receiver structure and the elongated member.

20. A method of securing a first chair section to a second chair section, the method comprising the acts of:

providing an outwardly extending elongated member on the second chair section, wherein the elongated member includes transverse engagement structure;

engaging the first chair section with the elongated member by inserting the elongated member into a passage associated with the first chair section, wherein the passage is defined by a pair of spaced apart sections, and wherein the elongated member extends through a first one of the spaced apart sections and into engagement with a second one of the spaced apart sections, wherein an intermediate portion of the elongated member which includes the transverse engagement structure is located within the space between the first and second spaced apart sections; and placing a locking member within the space between the first and second spaced apart sections, wherein the locking member includes a passage through which intermediate portion of the elongated member extends, wherein the locking member is movable within the space between the spaced apart sections between a locking position in which locking structure associated with the locking member engages the transverse engagement structure of the elongated member so as to prevent relative axial movement between the elongated member and the first chair section, and an unlocked position wherein the locking structure associated with the locking member disengages the transverse engagement structure of the elongated member so as to enable relative movement between the first chair section and the elongated member.

* * * * *